United States Patent [19]

Parker

[11] Patent Number: 4,631,332

[45] Date of Patent: Dec. 23, 1986

[54] USE OF BENZO-N-HETEROCYCLES TO ADVANCE EPOXY RESINS

[75] Inventor: Theodore L. Parker, Lafayette, Calif.

[73] Assignee: The Dow Chemical Company, Midland, Mich.

[21] Appl. No.: 796,145

[22] Filed: Nov. 8, 1985

[51] Int. Cl.$^4$ .............................................. C08G 59/02
[52] U.S. Cl. ....................................... 528/117; 528/96; 528/220; 528/367; 528/369; 548/165; 548/229
[58] Field of Search ................ 528/96, 117, 220, 369, 528/367; 548/165, 229

[56] References Cited

U.S. PATENT DOCUMENTS

| | | | |
|---|---|---|---|
| 3,415,901 | 12/1968 | Schramm et al. | 528/96 X |
| 3,789,053 | 1/1974 | Clarke | 528/96 |
| 3,943,109 | 3/1976 | Porret | 528/367 |
| 4,341,693 | 7/1982 | Buxbaum | 528/96 X |
| 4,350,781 | 9/1982 | Rasshofer et al. | 528/117 X |

*Primary Examiner*—Earl Nielsen
*Attorney, Agent, or Firm*—Robert R. Stringham

[57] ABSTRACT

Advanced epoxides which develop desirable resin properties and processing characteristics at considerably lower degrees of advancement than conventional advancement products are obtainable by employing a benzoxazolone or a hydroxy benzimidazole as the advancing agent.

25 Claims, No Drawings

USE OF BENZO-N-HETEROCYCLES TO ADVANCE EPOXY RESINS

BACKGROUND OF THE INVENTION

The use of epoxy resins as casting resins and molding compounds is well known. In such application, the resins desirably have certain of the properties generally shown by higher molecular weight resins, i.e., are non-sintering, flakable solids, but also have the lower equivalent weights and low melt viscosities characteristic of lower molecular weight resins. It will be appreciated that resins having such a combination of properties are not easily come by; a compromise is generally made.

Conventional expedients include adducting novolacs per se with the diglycidylether of bisphenol A (DGEBA) and the use of ring-substituted epoxy novolacs, such as—for example—"epoxidized" cresol novolacs. The novolac components of such adducts or substituted epoxides consist predominantly of linear, oligomeric molecules having an average of from about 3 to 6 phenolic hydroxyls—as such or as glycidyl ethers thereof.

DGEBA, a low molecular weight diepoxide, is conventionally "advanced" to a higher molecular weight through adduction of oxirane groups with phenolic hydroxyls in novolacs or bisphenols (Bisphenol-A or "bis A", predominantly), thereby producing polyether polyhydroxy epoxides. The adduction conventionally is carried out in the presence of a catalyst or initiator constituting about 0.1 wt. % of the reaction mixture. Typically, the epoxide to bisphenol weight ratio is about 3:1 and the phr of the phenol (parts bisphenol per hundred parts of the "resin" or epoxide) is about $100/3 \times 1 = 33.3$. The reactants and catalyst are heated rapidly to onset of an exotherm, at about 150° C. The exotherm is allowed to drive the temperature to a peak value of about 180°–200° C. and then to subside until the temperature reaches about 160° C. This temperature is maintained for about 3 hours and the product is poured into trays and allowed to cool and solidify or is "flaked" (cooled and solidified in the form of chips or flakes).

The resulting advancement products are generally prone to sinter if they have softening points of about 60° C. or less.

Not all conventional molding or casting epoxies are solids and, of those which are, not all are flakable and/or non-sintering. That is, the inconveniences involved in using resins which can't be flaked and which "sinter" or "block" (lose particulate form by fusing under their own weight at ordinary temperatures) are accepted as a trade-off against the higher costs and/or poorer heat resistances (when cured) of more easily worked-with resins. Another trade-off against cost is slower gellation. That is, the lower functionality resins, although slower gelling, are also less expensive and may be acceptable on this account in some specific applications.

Thus, the ordinary unsubstituted novolac epoxides have acceptably lower melt viscosities and relatively high functionalities and glass transition temperatures (Tg's) but cannot be utilized simply as crude reaction mixtures which have not been worked up (working up costs money). They also sinter, by reason of unavoidably including excessive proportions of low molecular weight species. The solid epoxides obtained by advancement of DGEBA with bisphenol A can be used simply as fusion mixtures but will have high melt viscosities, low Tg's and lower functionalities when of sufficient average molecular weight to be non-sintering. The substituted novolac epoxides have high Tg's, do not include excessive proportions of low molecular weight species and have relatively high functionalities. However, they cannot be used as reaction mixtures which have not been worked up (to remove solvents, by-products, etc.) and have somewhat high melt viscosities.

The linear, solid, advanced epoxy resins prepared by advancing DGEBA with bisphenol A are sold commercially by Dow, Shell, and others. These resins are solid, non-sintering materials which are suitable for powder coatings, solvent borne coatings, adhesives, and encapsulants. However, they have been found to be unsuitable for many applications due to their low cured glass transition and heat distortion temperatures. Additionally, even at the lowest level of bisphenol advancement necessary to obtain a non-sintering product, a relatively high proportion of the epoxide groups must be reacted out leaving fewer oxiranes ultimately available for curing. Lowest EEW (Epoxide Equivalent Weight) values are around 525 for these resins.

To the best of the present inventor's knowledge, it has not been suggested that advanced epoxides having more desirable characteristics might be obtainable by use of some other type of difunctional, oxirane-reactive compound than a bisphenol, as the advancing agent.

U.S. patent application Ser. No. 763,866, filed Aug. 9, 1985 in the name of the instant inventor, discloses the use of benzo-N-heterocycles as latent cross-linkers for epoxy resins. Each of two oxiranes in an epoxide molecule can be reacted, by NH/oxirane adduction, with—for example—2-(3H)-benzoxazolone, at moderate temperatures. The resulting diadducts are miscible with epoxides and will rearrange, at elevated temperatures, to difunctional phenols. Also disclosed is the utility of benzoxazolones as chain extenders for epoxides.

2-(3H)-benzoxazolone and another type of difunctional, oxirane-reactive benzo-N-heterocycle have now been tried as advancement agents for DGEBA.

OBJECTS OF THE INVENTION

A primary object of the present invention is to provide a method of advancing epoxides which results in development of desirable resin properties and processing characteristics at considerably lower degrees of advancement.

A corrolary object is to provide advanced epoxides as friable, non-sintering solids which have lower EEW's and as good or better properties than conventional resins of the same molecular weight.

A further object is to provide cured advancement products having higher glass transition temperatures, better adhesion and better impact resistance.

Another object is to utilize readily available, relatively inexpensive materials, in smaller amounts, for the advancement of epoxides.

Still other objects will be made apparent to those knowledgeable in the art by the following specifications and claims.

SUMMARY OF THE INVENTION

It has been found that the foregoing objects can be attained by employing as an advancing agent for epoxides a benzoxazolone or a hydroxy benzimidazole (a 2-benzimidazolone).

In a process aspect, the invention may be more precisely defined as the process for advancing a difunctional epoxide which comprises reacting the epoxide, in the presence of an advancement catalyst, with from about 0.33 to about 1 molecular proportion of a benzo-N-heterocycle of the formula:

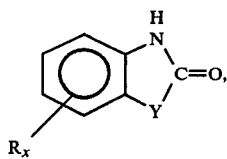 (1)

wherein x is zero, 1 or 2, Y is NH, O or S and each R is a non-interfering substituent, the same or different in each occurrence.

Preferably, Y is O and/or x is zero, and/or from about 0.42 to about 0.88 molecular proportions of the compound of formula (1) are employed (per molecular proportion of the epoxide).

In a broad compositional aspect, the present invention is an advanced epoxide prepared by the process of the invention. In a narrower aspect, the invention is a diepoxide which may be represented by the ideal formula:

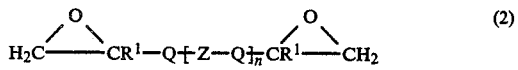 (2)

wherein $R^1$, independently in each occurrence, is H or $CH_3$, Q is a divalent organic radical, n is an average value within the range of from 1 to about 13, and Z, independently in each occurrence, is a moiety of formula (3) or (4) following:

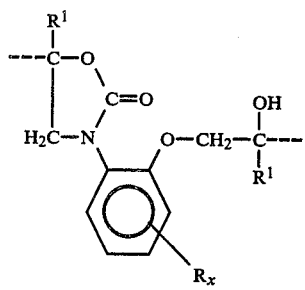 (3)

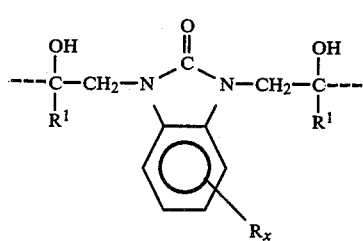 (4)

wherein, in formulas (3) and (4), independently in each occurrence, $R^1$ is H or $CH_3$, x is zero, 1 or 2, and R is a non-interfering substituent the same or different in each occurrence.

In formulas (3) and (4), x is preferably zero and, in formula (2), Q preferably is —$CH_2$—O—J—O—$CH_2$—, the same in each occurrence, with J also being a divalent organic radical—which preferably is a bisphenol A residue, i.e.,

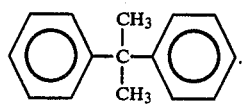

Terminology

By the term "non-interfering substituent" is meant one which it is synthetically feasible to incorporate in the compound of formula (1) and which does not detrimentally effect the advancement reactions to an intolerable extent.

The compound of formula (1) in which x is zero and Y is O is named according to more systematic nomenclature as 2-(3H)-benzoxazolinone but the older name 2-(3H)-benzoxazolone (or simply 2-benzoxazolone) will be used henceforth herein.

DETAILED DESCRIPTION

2-BEnzoxazolone tends to react in several stages with epoxides, i.e., NH/oxirane adduction, rearrangement of the adduct to a phenol and phenolic OH/oxirane adduction. The first adduction proceeds readily at only moderately elevated temperatures but the rate of the rearrangement reaction remains quite low at temperatures up to about 150° C. At more elevated temperatures, rearrangement and the second adduction proceed rapidly, with liberation of heat. These several reactions may be represented, for the subject benzoxazolones in general, as

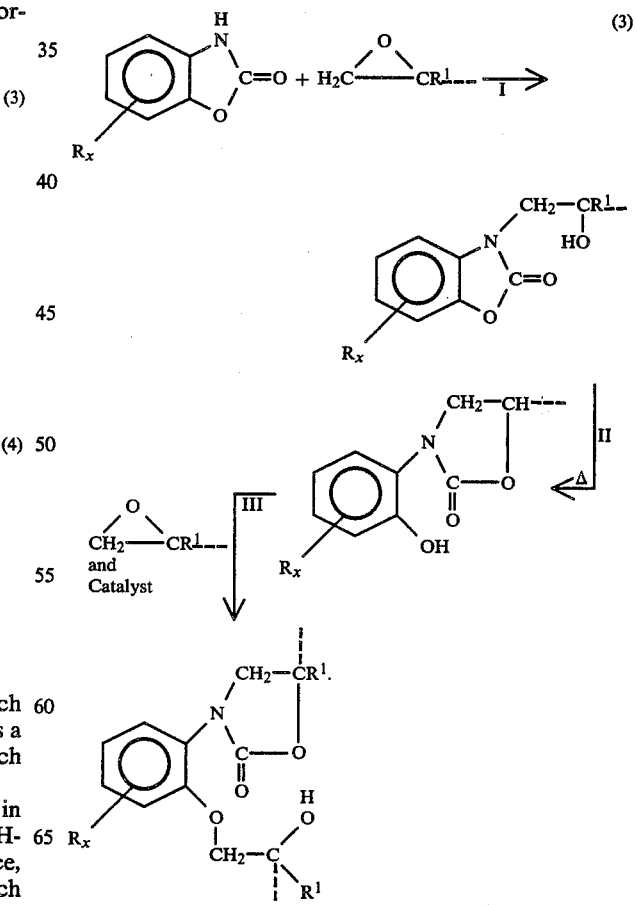 (3)

That is, epoxide molecules comprising one alcoholic hydroxyl for each oxirane converted are linked together by units of the formula (3) in alternating sequence to form the linear advancement products of formula (2). By using less than one molecule of the benzoxazolone per molecule of the diepoxide and limiting the reaction time, an advancement product in which a high proportion of the molecules are terminated at each end by oxirane groups is attainable.

When the compound of formula (1) is a 2-hydroxybenzimidazole (which reacts as the keto form), no rearrangement is involved. Two NH/oxirane adductions occur. The advancement reaction is exothermic but does not appear to become self-sustaining at temperatures below about 145° C. The resulting links between the diepoxide residues may be represented by the foregoing formula (4).

In laboratory scale advancements, cooling is generally not required to avoid exotherm peak temperatures greater than about 180° C.; in fact, heating is generally necessary to maintain the peak temperature, once reached. Higher temperatures—up to the point of intolerable decomposition or cross-linking—are not ruled out but are generally unnecessary. A residence time of about 1 hour at 180° C. is ordinarily suitable.

Use of a catalyst is not indispensable, providing that advancement products which are less uniform in composition and have substantially less linear structures are acceptable and considerably longer reaction periods are not unsatisfactory. However, it is highly preferred to use a catalyst.

Any otherwise suitable compound which is capable of promoting OH/oxirane and/or NH/oxirane adduction may be employed to catalyze the advancement reaction. However, phosphonium-type compounds of the types conventionally employed to catalyze advancement (and/or curing) of epoxides are preferred.

Exemplary suitable catalysts are trialkyl phenyl phosphonium acetates or tetrafluoroborides and tetraalkyl phosphonium acetates or tetrafluoroborides.

Although the present process is preferably carried out in the conventional melt fusion fashion, the presence of solvents is not ruled out. However, sufficient liquidity of the reaction system can often be attained by use of reactive diluents or inclusion of minor proportions of liquid diepoxides with higher melting solid epoxides.

Suitable epoxides are difunctional epoxides in general. Advantageously, they are of the formula

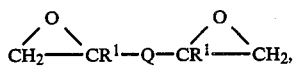

wherein $R^1$ and Q are as defined earlier herein with regard to formula (2).

No reason is apparent why the present method cannot be employed to advance any such epoxide in which the oxiranes are reactive—at least in the presence of a catalyst—with phenolic OH or with activated NH groups. Specific types of epoxides considered advanceable compounds of the foregoing formula (1) are the diglycidyl ethers of mono- or dinuclear diphenols, glycidyl esters of dioic acids, hydantoin epoxides, diglycidyl ether, cycloalkyladiene diepoxides, polybutadiene diepoxides, diglycidyl ethers of polyglycols, etc. Most preferred are the diglycidyl ethers of bisphenols of the formula

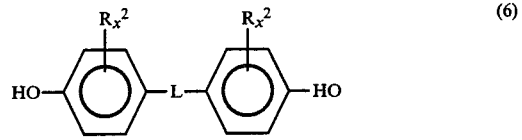

wherein L is a valence bond, an alkylene or haloalkylene radical, O, S, S—S, SO, $SO_2$, CO, SiO or $C(CF_3)_2$ and, independently in each occurrence, x is zero, 1 or 2, and R is $C_1$–$C_3$ alkyl or alkenyl, Br, Cl, methoxy or ethoxy.

Suitable Benzo-N-heterocycles

The following radicals are considered representative of the non-interfering R groups which may be present on the benzo-ring in the compounds of the foregoing formula (1): cyano, halo, nitro, $C_1$–$C_5$ alkoxy, phenoxy, $C_1$–$C_5$ alkyl or alkenyl, $C_6$–$C_{10}$ aryl, aralkyl or alkaryl and $C_1$–$C_5$ alkylthio.

The compounds of formula (1) which are not commercially available can be prepared from the corresponding phenols, thiophenols or anilines, ring-substituted in an ortho position by an $NH_2$ group. The o-aminophenols (etc.) are reacted in a known manner with phosgene or trichloromethyl chloroformate. The o-aminophenols themselves are made by well-known procedures—most notably, by reduction of the corresponding o-nitrophenols.

Known benzo-N-heterocycles of formula (1) in which Y is O or S include 2-benzoxazolone, 2-benzothiazolone, 5- and 6-monochloro-2-benzoxazolones and 7-methoxy-2-benzoxazolone.

Known o-aminophenols include 2-amino-3-chlorophenol, 2-amino-4-chloro-5-nitrophenol, 2-amino-6-chloro-4-nitrophenol, 2-amino-4,6-dibromophenol, 2-amino-3,5-dichlorophenol, 4,6-diaminoresorcinol, 2,3-diaminoquinol and 2,5-diaminoquinol. 2-Benzimidazolone, per se, is commercially available. Known substituted 2-benzimidazolones include the 5,6-dinitro-, the 4-carboxy- and 5-carboxy derivatives (from the latter two of which the corresponding cyano derivatives may be prepared by known methods).

Known o-phenylene diamines, from which the corresponding substituted 2-benzimidazolones can be prepared, include the 4-methyl-, 4-methoxy, 4,5-dimethoxy-, 4-bromo-, 4-chloro, 3,5-dichloro-, 4,6-dichloro-, 4-nitro-, 3-nitro-3,5-dinitro- and 3-methyl-6-methoxy-1,2-diamine benzenes.

With regard to methods of making derivatives of 2-benzimidazolone, see K. Hofmann, *Imidazole and Its Derivatives*, Interscience; N.Y., N.Y., 1953. See also Volumes $IV^I$ and $IV^J$ (soon to be published) of the second edition of *Rodd: Organic Chemistry of Carbon Compounds*.

It may be noted that 2-benzimidazolone reacts as such, even though it is indicated by infrared spectroscopy to be largely in the enol form, i.e., to be largely 2-hydroxybenzimidazole.

General Procedure

The epoxide to be advanced is heated under an inert atmosphere ($N_2$, for example) to a temperature sufficiently elevated to assure stirrability (but preferably not greater than about 135° C.). The compound of formula (1) is added an the mixture stirred until at least a portion of the compound has dissolved. A catalytically effective amount (0.1 g per 100 g epoxide, typically) of the selected catalyst is added and the mixture is stirred and heated, as necessary, until the reaction becomes self-sustaining. When the exotherm peaks, heating is resumed as necessary to maintain the peak temperature—preferably about 180° C.—for the period of time required to raise the EEW of the reaction mixture to the preselected value.

The advancement products of the present invention of course may be employed as formulations, i.e., in admixture with reactive diluents, fillers, solvents, etc., in accordance with conventional practices for various applications of advanced epoxides.

Suitable and preferred ranges of OH and/or NH/oxirane mole ratios are given in Table 1, following, for several specific epoxide/advancement agent combinations. These mole ratios have the same number values as the equivalent ratios because both reactants have the same functionality (two).

equiv.) of D.E.R. ®-331 and heated to 100° C. under a slow flow of N$_2$. 15.15 Grams (0.223 equiv.) of 2-benzoxazolone was added and the resulting mixture heated with stirring to about 105°–110° C. and kept at that temperature until the benzoxazolone had dissolved. Then 0.1% by (total) weight of a 70% solution of A-2 catalyst (0.1 gram per 100 grams resin of tetrabutyl phosphonium acetate) was added. The mixture was heated to 150° C., exothermed to 180° C. and was held at the temperature for one hour. It was then poured onto aluminum foil and allowed to cool to a hard, brittle material having an EEW of 512 (vs. a theoretical value of 445, calculated from the reactant ratio employed).

B;C Advancement 1A was essentially repeated but at two successively high benzoxazolone to epoxide ratios. Mettler dropping points and viscosities at 150° C. were determined for each of products A, B and C. See Table 2, following.

TABLE 1

SUITABLE AND PREFERRED REACTANT RATIOS FOR SPECIFIC ADVANCEMENT AGENT/EPOXIDE COMBINATIONS

| Epoxide & EEW Agent Equiv. Wt. | D.E.R. ®-331* EEW = 189 | | | | D.E.R. ®-332** EEW = 174 | | | |
|---|---|---|---|---|---|---|---|---|
| | 2-Benzoxazolone ~68 | | 2-Benzimidazolone ~67 | | 2-Benzoxazolone ~68 | | 2-Benzimidazolone ~67 | |
| | Suitable | Preferred | Suitable | Preferred | Suitable | Preferred | Suitable | Preferred |
| Parts agent per 100 parts by wt. of epoxide | 12.0–35.7 | 15.0–31.5 | 12.0–35.5 | 15.0–31.0 | 14.0–38.8 | 18.0–34.5 | 14.0–38.5 | 18.0–34.0 |
| Agent to epoxide mol ratio | 0.33–0.99 | 0.42–0.88 | 0.33–1 | 0.42–0.87 | 0.36–0.99 | 0.46–0.88 | 0.36–1 | 0.47–0.88 |

NOTES:
*Dow Epoxy Resin-331 is an about 5% hydrolyzed diepoxide of the following formula; $\bar{x} = 0.15$:

$$CH_2\text{---}CH\text{---}CH_2\text{---}O\text{---}\bigcirc\text{---}\underset{CH_3}{\overset{CH_3}{C}}\text{---}\bigcirc\text{---}O\text{---}CH_2\text{---}\underset{OH}{CH}\text{---}CH_2]_x\text{---}O\text{---}\bigcirc\text{---}\underset{CH_3}{\overset{CH_3}{C}}\text{---}\bigcirc\text{---}O\text{---}CH_2\text{---}CH\text{---}CH_2$$

**Dow Epoxy Resin-332 is essentially the diglycidyl/ether of bisphenol A; i.e., is a non-hydrolyzed diepoxide, of the preceding formula, for which $\bar{x} = 0$.

Suitable Curing Agents

The advanced epoxides of the present invention may be cured with any of the curing agents conventionally employed for the epoxide (or epoxides) selected for advancement by the present method. Also suitable for the latent during agents disclosed in said application Ser. No. 763,866. In general, any epoxide which can be advanced by the present method can be cured with those agents which are suitable for curing of the unadvanced epoxide or of otherwise comparable epoxides of higher molecular weights.

The preferred curing agents for DGEBA epoxides advanced by the present method are bisphenols and polyfunctional, reactive methylol compounds.

EXAMPLES

The following examples are for purposes of illustration and are not to be construed as limiting the present invention in a manner inconsistent with the claims in this patent.

EXAMPLE 1

Effect of reactant ratio on EEW, softening Point and Viscosity (@150° C.) of resins prepared by advancing D.E.R. ®-331 with 2-benzoxazolone.

A. A round-bottomed flask, equipped with a mechanical stirrer, gas inlet and outlet and a thermocouple controller probe, was charged with 84.85 grams (0.449

TABLE 2

| Product Resin | Benzoxazolone/Epoxide | | | EEW[2] | | S.P.[3] °C. | Viscosity[4] at 150° C. |
|---|---|---|---|---|---|---|---|
| | n[5] | PHR[1] | Mole Ratio | Calc. | Found | | |
| A | 1.26 | 17.86 | 0.497 | 445 | 512 | 91.3 | 1,212 |
| B | 2.52 | 25.00 | 0.695 | 787 | 836 | 117.8 | 11,650 |
| C | 3.89 | 28.21 | 0.784 | 1152 | 1189 | 134.5 | 66,250 |

NOTES:
[1]Parts benzoxazolone per hundred parts epoxide.
[2]Average of values for two samples.
[3]Softening Point (Mettler Dropping Point; average of two).
[4]Centipoises.
[5]In formula [2] herein.

The approximate value of n in the foregoing formula (2) for a given advancement product can be calculated as $$n = (2 \cdot \overline{EEW} - M_E) \div (M_E + M_A),$$

wherein $\overline{EEW}$ is the epoxide equivalent weight found experimentally, $M_A$ is the molecular weight of the advancing agent and $M_E$ is the molecular weight of the epoxide (taken as 2x the EEW of the epoxide). That is, in formula (2),

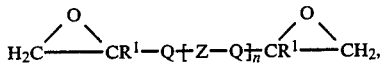

the starting epoxide is of formula (5),

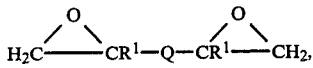

and each —Z—Q— group is equivalent to one molecule of the starting epoxide and one molecule of the advancing agent.

For D.E.R. ®-331, $M_E=2\times 189=378$; for benzoxazolone $M_A=136$ and for 2-benzimidazolone $M_A=134$. Thus, for example, the approximate value of n was calculated for the advancement products in Table 2 as:

$$n=(2\cdot\overline{EEW}-378)\div(378+136)$$

or $$n=(2\cdot\overline{EEW}-378)\div 514.$$

EXAMPLE 2

Effect of reactant ratio on EEW and softening point of resins prepared by advancing D.E.R. ®-331 with 2-benzimidazolone.

A. 86 Grams (~0.23 moles) of D.E.R.-331 was heated to 100° C. One drop of A-1 catalyst (ethyl triphenyl phosphonium acetate) was added and then 14 grams (~0.104 moles) of the benzimidazolone. The temperature was raised to 175° C. and held one hour. When poured on foil and allowed to cool, the product resin was a hard, brittle and friable, non-sintering solid having an EEW of 461 (vs. 406 theoretical) and a Mettler dropping point of 90.4° C.

B. When advancement 2A was essentially repeated but using 19 grams (~0.142 moles) of the benzimidazolone and 81 grams (~0.214 moles) of the epoxide, the product was still a hard, brittle, friable, non-sintering solid but had an EEW of 823 (vs. 690 calc.) and a Mettler dropping point of 117.1° C.

TABLE 3

| Product Resin | $n^1$ | Benzimidazolone/-Epoxide Mole Ratio | EEW Calc. | EEW Found | Mettler Dropping Point °C. |
|---|---|---|---|---|---|
| A | 1.06 | 0.104/0.23 = ~0.45 | 406 | 461 | 90.4 |
| B | 2.48 | 0.142/0.214 = ~0.66 | 690 | 823 | 117.1 |

NOTE:

$^1 n = (2\cdot\overline{EEW}-378)\div(378+134) = (2\cdot\overline{EEW}-378)\div 512.$

EXAMPLE 3

Increase in Mettler Dropping Point as degree of advancement goes up; effective of using advancement agents of the invention as compared to using bisphenol A.

The Mettler dropping points of otherwise comparable advancement products of D.E.R.-331 derived from bisphenol a, 2-benzoxazolone and 2-benzimidazolone are given in Table 4, following. It will be seen that comparably elevated dropping points are attained at considerably lower EEW's by the method of the invention

TABLE 4

COMPARISON OF METTLER DROPPING POINT FOR ADVANCED D.E.R. ® -331 RESINS

| Advanced Resin EEW | $x^{(1)}$ | Bisphenol A | Mettler Dropping Point, °C. Advancement Material Benzoxazolone | $n^{(2)}$ | Hydroxy-benzimidazole |
|---|---|---|---|---|---|
| 460 | | | | 1.06 | 90 |
| 510 | | | 91 | 1.25 | |
| 525 | 2–3 | 70–80 | | | |
| 650 | 3–4 | 80–90 | | | |
| 823 | | | | 2.48 | 117 |
| 836 | | | 118 | 2.52 | |
| 925 | 5–6 | 95–105 | | | |
| 1800 | 10–13 | 113–123 | | | |
| 1190 | | | 135 | 3.89 | |
| 4500 | 23–38 | 135–155 | | | |

NOTES:
$^{(1)}$In formula of note 1, Table 1.
$^{(2)}$In formula (2) herein; see paragraphs after Table 1 and note (1), Table 2.

EXAMPLE 4

Comparison of Tg's (Glass Transition Temperatures) of bisphenol A cured advancement products of D.E.R.-331 with bisphenol A, 2-benzoxazolone and 2-benzimidazolone.

The advanced resins identified in Table 5, following, were melt-blended at the lowest possible temperature (about 110–120° C.) with a stoichiometric amount of bisphenol A and cured two hours at 100° C. and 18 hours at 180° C. The Tg's of the cured samples were determined by DSC (Differential Scanning Colorimetry).

TABLE 5

Tg's of Solid Advanced D.E.R.-331's Cured With Equivalent Amounts of Bisphenol A

| Advanced With | RESIN EEW | $n^{(2)}$ | Grams | Grams of Bisphenol Used As Curing Agent | Tg °C. |
|---|---|---|---|---|---|
| Benzimidazolone | 461 | 1.06 | 0.801 | 0.199 | 101 |
| | 823 | 2.48 | 0.878 | 0.122 | 100 |
| Benzoxazolone | 512 | 1.26 | 0.817 | 0.183 | 98 |
| | 836 | 2.52 | 0.880 | 0.120 | 95 |
| Bisphenol A | | | | | |
| D.E.R.-661 $x^{(1)} = \sim 2.5$ | 525 | | 0.822 | 0.178 | 81 |
| D.E.R.-664U $x = \sim 5.5$ | 925 | | 0.890 | 0.110 | 71 |

NOTES:
$^{(1)}$In formula of note 1, Table 1.
$^{(2)}$In formula $^{(2)}$; see paragraphs after Table 2 and note $^{(1)}$, Table 3.

It appears from the data in Table 5 that somewhat higher, cured-resin Tg's result when DGEBA-type epoxide is advanced with a compound of formula (1) in which Y is NH, rather than O, i.e., with a benzimidazolone, rather than a benzoxazole.

For advancement products of formula (2) made by the process of the present invention those made from DGEBA-type epoxides and having n values (calculated as explained earlier herein) of from about 1.25 to about 4 are preferred. For those products derived from other types of epoxides, n values of about 1.25 to about 6 are preferred.

What is claimed is:

1. The process for advancing a difunctional epoxide which comprises reacting the epoxide, in the presence of an advancement catalyst, with from about 0.33 to about 1 molecular proportions of a benzo-N-heterocycle of the formula

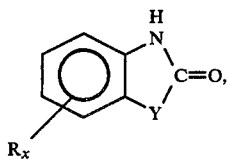

wherein Y is NH, O or S and each of $R^1$, $R^2$, $R^3$ and $R^4$, independently, is H or a non-interfering substituent, and x is zero, 1 or 2.

2. The process of claim 1 in which Y is O.
3. The process of claim 1 in which x is zero.
4. The process of claim 1 in which about 0.42 to about 0.88 molecular proportions of the compound of formula (1) are employed per molecular portion of said epoxide.
5. The process of claim 2 in which x is zero.
6. The process of claim 4 in which Y is O and x is zero.
7. The process of claim 1 in which Y is NH.
8. The process of claim 4 in which Y is NH.
9. The process of claim 7 in which x is zero.
10. The process of claim 8 in which x is zero.
11. The product of the process of claim 1.
12. An epoxide of the formula

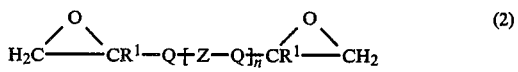

wherein $R^1$, independently in each occurrence, is H or methyl, Q is a divalent organic radical, the same or different in each occurrence, n is an average value within the range of from 1 to about 13, and Z, independently in each occurrence, is a moiety of either of the following formulas (3) and (4):

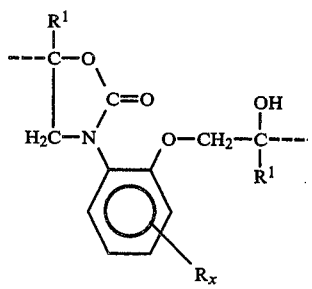

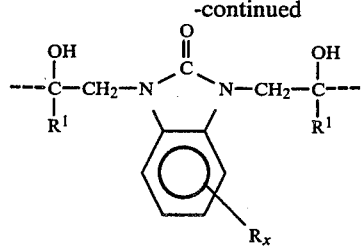

wherein, in said formulas (3) and (4), independently in each occurrence, $R^1$ is H or $CH_3$, x is zero, 1 or 2, and R is a non-interfering substituent, the same or different in each occurrence.

13. An epoxide of claim 12 having an n value within the range of from about 1.25 to about 6.
14. An epoxide of claim 13 in which the moiety —Z— is of formula (3) and x is zero.
15. An epoxide of claim 13 in which the moiety Z is of formula (4) and x is zero.
16. An epoxide of claim 12 in which Q, in each occurrence, is —$CH_2$—O—J—O—$CH_2$—, J being a divalent organic radical.
17. An epoxide of claim 16 in which the moiety Z is of formula (3) and x is zero.
18. An epoxide of claim 16 in which the moiety Z is of formula (4) and x is zero.
19. An epoxide of claim 16 in which J is of the formula

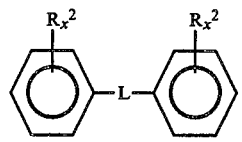

wherein L is a valence bond, an alkylene or haloalkylene radical, O, S, S—S, SO, $SO_2$, CO, SiO or $C(CF_3)_2$ and, independently in each occurrence, x is zero, 1 or 2, and R is $C_1$–$C_3$ alkyl or alkenyl, $C_1$–$C_3$ alkoxy, Br or Cl.

20. An epoxide of claim 19 having an n value within the range of from about 1.25 to about 4.
21. An advancement product of claim 11, the molecular proportions of said compound of formula (1) having been employed in said process per molecular proportion of said epoxide being within the range of from about 0.42 to about 0.88.
22. The cured advancement product of claim 11.
23. The cured advancement product of claim 21.
24. The cured epoxide of claim 12.
25. The cured epoxide of claim 19.

* * * * *